United States Patent
Galeotti et al.

(10) Patent No.: US 12,488,577 B2
(45) Date of Patent: Dec. 2, 2025

(54) SYSTEM AND METHOD FOR ANALYZING MEDICAL IMAGES BASED ON SPATIO-TEMPORAL DATA

(71) Applicant: Carnegie Mellon University, Pittsburgh, PA (US)

(72) Inventors: John Galeotti, Pittsburgh, PA (US); Tejas Sudharshan Mathai, Seattle, WA (US)

(73) Assignee: Carnegie Mellon University, Pittsburgh, PA (US)

( * ) Notice: Subject to any disclaimer, the term of this patent is extended or adjusted under 35 U.S.C. 154(b) by 424 days.

(21) Appl. No.: 17/762,906

(22) PCT Filed: Sep. 24, 2020

(86) PCT No.: PCT/US2020/052442
§ 371 (c)(1),
(2) Date: Mar. 23, 2022

(87) PCT Pub. No.: WO2021/061947
PCT Pub. Date: Apr. 1, 2021

(65) Prior Publication Data
US 2022/0383500 A1      Dec. 1, 2022

Related U.S. Application Data

(60) Provisional application No. 62/904,728, filed on Sep. 24, 2019.

(51) Int. Cl.
*G06V 10/82* (2022.01)
*G06T 7/00* (2017.01)
*G06T 7/20* (2017.01)

(52) U.S. Cl.
CPC ............ *G06V 10/82* (2022.01); *G06T 7/0016* (2013.01); *G06T 7/20* (2013.01);
(Continued)

(58) Field of Classification Search
CPC .. G06V 10/82; G06V 2201/03; G06V 10/764; G06V 40/14; G06T 7/0016;
(Continued)

(56) References Cited

U.S. PATENT DOCUMENTS

| 2018/0218502 A1 | 8/2018 | Golden et al. |
| 2019/0122360 A1 | 4/2019 | Zhang et al. |

(Continued)

FOREIGN PATENT DOCUMENTS

| CA | 2534701 A1 | 7/2007 |
| CN | 109427058 A | 3/2019 |

(Continued)

OTHER PUBLICATIONS

Khened, M., Kollerathu, V.A. and Krishnamurthi, G., 2019. Fully convolutional multi-scale residual DenseNets for cardiac segmentation and automated cardiac diagnosis using ensemble of classifiers. Medical image analysis, 51, pp. 21-45.*

(Continued)

*Primary Examiner* — Zhitong Chen
(74) *Attorney, Agent, or Firm* — The Webb Law Firm

(57) ABSTRACT

Provided is a system, method, and computer program product for analyzing spatio-temporal medical images using an artificial neural network. The method includes capturing a series of medical images of a patient, the series of medical images comprising visual movement of at least one entity, tracking time-varying spatial data associated with the at least one entity based on the visual movement, generating spatio-temporal data by correlating the time-varying spatial data with the series of medical images, and analyzing the series of medical images based on an artificial neural network comprising a plurality of layers, one or more layers of the plurality of layers each combining features from at least three different scales, at least one layer of the plurality of (Continued)

layers of the artificial neural network configured to learn spatio-temporal relationships based on the spatio-temporal data.

21 Claims, 5 Drawing Sheets

(52) U.S. Cl.
CPC .............. *G06T 2207/10016* (2013.01); *G06T 2207/20081* (2013.01); *G06T 2207/20084* (2013.01); *G06T 2207/30004* (2013.01)

(58) Field of Classification Search
CPC ............. G06T 7/20; G06T 2207/10016; G06T 2207/20081; G06T 2207/20084; G06T 2207/30004; G06T 7/0012; G06T 7/11; G06T 2210/41; G06F 18/24137; G06N 3/08; G06N 3/045
See application file for complete search history.

(56) References Cited

U.S. PATENT DOCUMENTS

| | | | |
|---|---|---|---|
| 2019/0223725 A1 | 7/2019 | Lu et al. | |
| 2019/0279361 A1 | 9/2019 | Meyer et al. | |

FOREIGN PATENT DOCUMENTS

| | | | |
|---|---|---|---|
| CN | 109598727 A | 4/2019 | |
| CN | 109690554 A | 4/2019 | |
| JP | H1103121 A | 4/1989 | |
| JP | 201937692 A | 3/2019 | |
| WO | 2019173237 A1 | 9/2019 | |

OTHER PUBLICATIONS

Yu, F. and Koltun, V., 2015. Multi-scale context aggregation by dilated convolutions. arXiv preprint arXiv:1511.07122.*

Ilea, D.E., Duffy, C., Kavanagh, L., Stanton, A. and Whelan, P.F., 2012. Fully automated segmentation and tracking of the intima media thickness in ultrasound video sequences of the common carotid artery. IEEE transactions on ultrasonics, ferroelectrics, and frequency control, 60(1), pp. 158-177 (Ilea).*

L Zhang, L Lu, X Wang, RM Zhu, M Bagheri . . .—arXiv preprint arXiv . . . , 2019—arxiv.org.*

Apostolopoulos et al, "Pathological OCT Retinal Layer Segmentation using Branch Residual U-shape Networks", Medical Image Computing and Computer Assisted Intervention MICCAI 2017, Lecture Notes in Computer Science vol. 10435, pp. 1-9.

Arbelle et al., "Microscopy Cell Segmentation via Convolutional LSTM Networks", IEEE ISBI, 2019, pp. 1008-1012.

Basty et al., "Super Resolution of Cardiac Cine MRI Sequences Using Deep Learning", Image Analysis for Moving Organ, Breast, and Thoracic Images, RAMBO 2018, Lecture Notes in Computer Science, vol. 11040, 10 pages.

Chaniot et al., "Vessel Segmentation in High-Frequency 2D/3D Ultrasound Images", IEEE Int Ultrasonics Symp., 2016, 4 pages.

Gao et al., "Fully Convolutional Structured LSTM Networks for Joint 4D Medical Image Segmentation", IEEE ISBI, 2018, pp. 1104-1108.

He et al., "Deep Residual Learning for Image Recognition", IEEE CVPR, 2016, pp. 770-778.

Jaeger et al., "Two public chest X-ray datasets for computer-aided screening of pulmonary diseases", Quant Imaging Med Surg, 2014 4(6), pp. 475-477.

Kingma et al., "Adam: A Method for Stochastic Optimization", ICLR, 2015, pp. 1-15.

Mathai et al., "Fast Vessel Segmentation and Tracking in Ultra High-Frequency Ultrasound Images", Medical Image Computing and Computer Assisted Intervention, MICCAI 2018, Lecture Notes in Computer Science, vol. 11073, 10 pages.

Mathai et al., "Learning to Segment Corneal Tissue Interfaces in OCT Images", IEEE ISBI, 2019, pp. 1432-1436.

Menchón-Lara et al., "Fully automatic segmentation of ultrasound common carotid artery images based on machine learning", Neurocomputing 151, 2015, pp. 161-167.

Milletari et al., "CFCM: Segmentation via Coarse to Fine Context Memory", Medical Image Computing and Computer Assisted Intervention, MICCAI 2018, Lecture Notes in Computer Science, vol. 11073, 9 pages.

Mohler III et al., "High Frequency Ultrasound for Evaluation of Intimal Thickness", J Am Soc Echocardiogr. 22(10), Oct. 2009, pp. 1129-1133.

Ronneberger et al., "U-Net: Convolutional Networks for Biomedical Image Segmentation", Medical Image Computer and Computer-Assisted Intervention, MICCAI 2018, Lecture Notes in Computer Science, vol. 9351, 8 pages.

Shin et al., "Automating Carotid Intima-Media Thickness Video Interpretation with Convolutional Neural Networks", CVPR, 2016, pp. 2526-2535.

Yu et al., "Multi-Scale Context Aggregation by Dilated Convolutions", ICLR, 2016, pp. 1-13.

Zhang et al., "A Multi-Level Convolutional LSTM Model for the Segmentation of Left Ventricle Myocardium in Infarcted Porcine Cine MR Images", IEEE ISBI, 2018, pp. 470-473.

Zhao et al., "Predicting Tongue Motion in Unlabeled Ultrasound Videos Using Convolutional LSTM Neural Networks", IEEE ICASSP, 2019, pp. 5926-5930.

Lu et al., "A 3D Convolutional Neural Network for Volumetric Image Semantic Segmentation", Procedia Manufacturing, 2019, pp. 422-428.

Milletari et al., "CFCM:Segmentation via Coarse to Fine Context Memory", arXiv:1806.01413v1, 2018, 10 pages.

Wang et al., "Comparative study between dual source CT coronary angiography and conventional coronary angiography: initial experience", Chin J Med Imaging Technol, 2008, pp. 881-884, vol. 24, No. 6 (English language abstract).

* cited by examiner

SYSTEM AND METHOD FOR ANALYZING MEDICAL IMAGES BASED ON SPATIO-TEMPORAL DATA

CROSS-REFERENCE TO RELATED APPLICATIONS

This application is the United States national phase of International Application No. PCT/US2020/052442 filed Sep. 24, 2020, and claims priority to U.S. Provisional Patent Application No. 62/904,728 filed on Sep. 24, 2019, the disclosures of which are incorporated by reference herein in their entirety.

BACKGROUND

1. Field

This disclosure relates generally to artificial neural networks and, in non-limiting embodiments, to systems, methods, and computer-program products for analyzing medical images based on spatio-temporal data using an artificial neural network.

2. Technical Considerations

Medical images acquired using optical coherence tomography (OCT), ultrasound, MRI, or other sequential acquisition methods may include a sequence of tomographic slices (or volumes, e.g., full frame OCT) obtained through a portion of a patient's body. These images are subject to changes from one slice (or volume) to the next based on a variety of different types of motions and/or orientations of the patient (internal or external), the instrument being used (e.g., an ultrasound probe), and/or the like. Moreover, existing neural networks used to analyze such images consider each image in the sequence independently from all others, and therefore these neural networks are not able to model motion, consider prior images in the sequence, or otherwise take into account the changing motion and/or orientation of the patient and/or instruments.

Intima-Media Thickness (IMT) is a parameter that quantifies risk in clinical applications, such as atherosclerotic plaque buildup. In particular, however, IMT can be used to track the functional progress of hand transplant recipients (or other composite tissue allotransplantation recipients), where the highest standard for monitoring changes is currently histopathology. Recently, Ultra-High Frequency Ultrasound (UHFUS) has been shown to quantitatively measure IMT through the resolution of vessel structures at 0.03 mm within a shallow tissue depth of 1 cm. However, this improved resolution also comes with an increase in speckle noise corrupting the vessel boundaries, which is in contrast to traditional ultrasound and High Frequency Ultrasound (HFUS) imaging devices. Furthermore, vessels at shallow depths contort themselves significantly (due to transducer pressure and motion) as opposed to vessels deeper in the body, such as the carotid artery. It is therefore desirable to have a system involving sub-mm localization of rapidly moving and pulsating vessel contours, and other entities, in UHFUS and HFUS sequences to compare changes in IMT over time.

Prior vessel-based segmentation approaches for ultrasound sequences fall into two categories. The first category, such as state-of-the-art level set methods for HFUS and UHFUS, are quick to execute, but lack the robustness needed in clinical use due to the fine tuning of parameters. The second category, including learning-based approaches, are resilient to changes in scan settings and variations in image quality, but are task specific without adequately harnessing inter-frame vessel dynamics, and therefore, not applicable to various different biomedical imaging modalities.

SUMMARY

According to non-limiting embodiments or aspects, provided is a method for analyzing spatio-temporal medical images using an artificial neural network, comprising: capturing a series of medical images of a patient with an imaging device, the series of medical images comprising visual movement of at least one entity comprising at least a portion of at least one of the patient and an object; tracking, with a computing device, time-varying spatial data associated with the at least one entity based on the visual movement; generating, with a computing device, spatio-temporal data by correlating the time-varying spatial data with the series of medical images; and analyzing, with a computing device, the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

In non-limiting embodiments or aspects, the one or more layers that combine features from the at least three different scales comprise dilated convolutions of different scales. In non-limiting embodiments or aspects, the one or more layers that combine features from the at least three different scales comprise dense and/or residual connections between at least a subset of layers of the plurality of layers, the at least the subset of layers comprising features from at least three different scales. In non-limiting embodiments or aspects, the one or more layers that combine features from the at least three different scales comprise convolutions of at least two different scales and connections to a subset of layers of the plurality of layers comprising features from at least two different scales, resulting in features of at least three different scales. In non-limiting embodiments or aspects, the at least one entity comprises at least one of the following: an instrument, the imaging device, a physical artifact, a manifested artifact, or any combination thereof.

In non-limiting embodiments or aspects, tracking the time-varying spatial data comprises tracking at least one of the following: translational/rotational positions of the at least one entity, a velocity of the at least one entity, an acceleration of the at least one entity, an inertial measurement of the at least one entity, or any combination thereof. In non-limiting embodiments or aspects, tracking the time-varying spatial data is based on at least one of the following: an inertial measurement unit, a tracking system, a position sensor, robotic kinematics, inverse kinematics, or any combination thereof. In non-limiting embodiments or aspects, the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof. In non-limiting embodiments or aspects, the artificial neural network comprises an encoder and a decoder, and wherein at least one of the decoder and the encoder is configured to utilize the spatio-temporal data as input. In non-limiting embodiments or aspects, the artificial neural network comprises at least one of the following: Long-Short Term Memory (LSTM) units, Gated Recurrent Units (GRUs), temporal convolutional networks, or any combination thereof.

In non-limiting embodiments or aspects, the spatial data comprises a position and/or orientation of the patient and/or an instrument. In non-limiting embodiments or aspects, analyzing the series of medical images comprises identifying at least one anatomic structure in the series of images, the at least one anatomic structure comprising at least one of the following: a vessel, an artery, a vein, a ligament, a nerve, a strand of muscle, a strand or meshwork of fascia, a blob of fat, a blob of grafted fat, a lymphatic structure, a patch of skin, a tendon, a bone, a piece of cartilage, a pulmonary pleural line, a cardiac valve, a cardiac chamber, a cardiac surface, a trachea, a brain region, a duct, trabecular meshwork, a corneal layer, a retinal layer, an ocular lens, an ocular surface, a soft tissue, a palisade of Vogt of a limbus, an organ, an extra-cellular structure, an intercellular structure, a cell, or any combination thereof. In non-limiting embodiments or aspects, the series of medical images comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof. In non-limiting embodiments or aspects, analyzing the series of medical images comprises segmenting one or a plurality of vessels represented in the series of medical images.

In non-limiting embodiments or aspects, at least a portion of the artificial neural network comprises dilated convolutions. In non-limiting embodiments or aspects, at least a portion of the artificial neural network comprises residual connections and/or skipped connections. In non-limiting embodiments or aspects, at least a portion of the artificial neural network comprises dilated convolutions. In non-limiting embodiments or aspects, at least a portion of the artificial neural network comprises residual connections and/or skipped connections.

According to non-limiting embodiments or aspects, provided is a system for analyzing spatio-temporal medical images using an artificial neural network, comprising a computing device programmed or configured to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

In non-limiting embodiments or aspects, the one or more layers that combine features from the at least three different scales comprise dilated convolutions of different scales. In non-limiting embodiments or aspects, the one or more layers that combine features from the at least three different scales comprise dense and/or residual connections between at least a subset of layers of the plurality of layers, the at least the subset of layers comprising features from at least three different scales. In non-limiting embodiments or aspects, the one or more layers that combine features from the at least three different scales comprise convolutions of at least two different scales and connections to a subset of layers of the plurality of layers comprising features from at least two different scales, resulting in features of at least three different scales. In non-limiting embodiments or aspects, the at least one entity comprises at least one of the following: an instrument, the imaging device, a physical artifact, a manifested artifact, or any combination thereof.

In non-limiting embodiments or aspects, tracking the time-varying spatial data comprises tracking at least one of the following: translational/rotational positions of the at least one entity, a velocity of the at least one entity, an acceleration of the at least one entity, an inertial measurement of the at least one entity, or any combination thereof. In non-limiting embodiments or aspects, wherein tracking the time-varying spatial data is based on at least one of the following: an inertial measurement unit, a tracking system, a position sensor, robotic kinematics, inverse kinematics, or any combination thereof. In non-limiting embodiments or aspects, the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof. In non-limiting embodiments or aspects, the artificial neural network comprises an encoder and a decoder, and wherein at least one of the decoder and the encoder is configured to utilize the spatio-temporal data as input. In non-limiting embodiments or aspects, the artificial neural network comprises at least one of the following: Long-Short Term Memory (LSTM) units, Gated Recurrent Units (GRUs), temporal convolutional networks, or any combination thereof.

In non-limiting embodiments or aspects, the spatial data comprises a position and/or orientation of the patient and/or an instrument. In non-limiting embodiments or aspects, analyzing the series of medical images comprises identifying at least one anatomic structure in the series of images, the at least one anatomic structure comprising at least one of the following: a vessel, an artery, a vein, a ligament, a nerve, a strand of muscle, a strand or meshwork of fascia, a blob of fat, a blob of grafted fat, a lymphatic structure, a patch of skin, a tendon, a bone, a piece of cartilage, a pulmonary pleural line, a cardiac valve, a cardiac chamber, a cardiac surface, a trachea, a brain region, a duct, trabecular meshwork, a corneal layer, a retinal layer, an ocular lens, an ocular surface, a soft tissue, a palisade of Vogt of a limbus, an organ, an extra-cellular structure, an intercellular structure, a cell, or any combination thereof. In non-limiting embodiments or aspects, the series of medical images comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof. In non-limiting embodiments or aspects, wherein analyzing the series of medical images comprises segmenting one or a plurality of vessels represented in the series of medical images.

According to non-limiting embodiments or aspects, provided is a computer program product for analyzing medical images using a neural network, comprising at least one non-transitory computer-readable medium including instructions that, when executed by a computing device, cause the computing device to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

According to non-limiting embodiments or aspects, provided is a method for analyzing spatio-temporal medical images using an artificial neural network, comprising: capturing a series of medical images of a patient with an imaging device, the series of medical images comprising visual movement of at least one entity comprising at least a portion of at least one of the patient and an object; tracking, with a computing device, time-varying spatial data associated with the at least one entity based on the visual movement; generating, with a computing device, spatio-temporal data by correlating the time-varying spatial data with the series of medical images; and analyzing, with a computing device, the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data. According to non-limiting embodiments or aspects, provided is a system for analyzing spatio-temporal medical images using an artificial neural network, comprising a computing device programmed or configured to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data. According to non-limiting embodiments or aspects, provided is a computer program product for analyzing medical images using a neural network, comprising at least one non-transitory computer-readable medium including instructions that, when executed by a computing device, cause the computing device to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data.

Other non-limiting embodiments or aspects will be set forth in the following numbered clauses:

Clause 1: A method for analyzing spatio-temporal medical images using an artificial neural network, comprising: capturing a series of medical images of a patient with an imaging device, the series of medical images comprising visual movement of at least one entity comprising at least a portion of at least one of the patient and an object; tracking, with a computing device, time-varying spatial data associated with the at least one entity based on the visual movement; generating, with a computing device, spatio-temporal data by correlating the time-varying spatial data with the series of medical images; and analyzing, with a computing device, the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

Clause 2: The method of clause 1, wherein the one or more layers that combine features from the at least three different scales comprise dilated convolutions of different scales.

Clause 3: The method of clauses 1 or 2, wherein the one or more layers that combine features from the at least three different scales comprise dense and/or residual connections between at least a subset of layers of the plurality of layers, the at least the subset of layers comprising features from at least three different scales.

Clause 4: The method of any of clauses 1-3, wherein the one or more layers that combine features from the at least three different scales comprise convolutions of at least two different scales and connections to a subset of layers of the plurality of layers comprising features from at least two different scales, resulting in features of at least three different scales.

Clause 5: The method of any of clauses 1-4, wherein the at least one entity comprises at least one of the following: an instrument, the imaging device, a physical artifact, a manifested artifact, or any combination thereof.

Clause 6: The method of any of clauses 1-5, wherein tracking the time-varying spatial data comprises tracking at least one of the following: translational/rotational positions of the at least one entity, a velocity of the at least one entity, an acceleration of the at least one entity, an inertial measurement of the at least one entity, or any combination thereof.

Clause 7: The method of any of clauses 1-6, wherein tracking the time-varying spatial data is based on at least one of the following: an inertial measurement unit, a tracking system, a position sensor, robotic kinematics, inverse kinematics, or any combination thereof.

Clause 8: The method of any of clauses 1-7, wherein the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof.

Clause 9: The method of any of clauses 1-8, wherein the artificial neural network comprises an encoder and a decoder, and wherein at least one of the decoder and the encoder is configured to utilize the spatio-temporal data as input.

Clause 10: The method of any of clauses 1-9, wherein the artificial neural network comprises at least one of the following: Long-Short Term Memory (LSTM) units, Gated Recurrent Units (GRUs), temporal convolutional networks, or any combination thereof.

Clause 11: The method of any of clauses 1-10, wherein the spatial data comprises a position and/or orientation of the patient and/or an instrument.

Clause 12: The method of any of clauses 1-11, wherein analyzing the series of medical images comprises identifying at least one anatomic structure in the series of images, the at least one anatomic structure comprising at least one of the following: a vessel, an artery, a vein, a ligament, a nerve, a strand of muscle, a strand or meshwork of fascia, a blob of fat, a blob of grafted fat, a lymphatic structure, a patch of skin, a tendon, a bone, a piece of cartilage, a pulmonary pleural line, a cardiac valve, a cardiac chamber, a cardiac surface, a trachea, a brain region, a duct, trabecular meshwork, a corneal layer, a retinal layer, an ocular lens, an ocular surface, a soft tissue, a palisade of Vogt of a limbus, an organ, an extra-cellular structure, an intercellular structure, a cell, or any combination thereof.

Clause 13: The method of any of clauses 1-12, wherein the series of medical images comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof.

Clause 14: The method of any of clauses 1-13, wherein analyzing the series of medical images comprises segmenting one or a plurality of vessels represented in the series of medical images.

Clause 15: A system for analyzing spatio-temporal medical images using an artificial neural network, comprising a computing device programmed or configured to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

Clause 16: The system of clause 15, wherein the one or more layers that combine features from the at least three different scales comprise dilated convolutions of different scales.

Clause 17: The system of clauses 15 or 16, wherein the one or more layers that combine features from the at least three different scales comprise dense and/or residual connections between at least a subset of layers of the plurality of layers, the at least the subset of layers comprising features from at least three different scales.

Clause 18: The system of any of clauses 15-17, wherein the one or more layers that combine features from the at least three different scales comprise convolutions of at least two different scales and connections to a subset of layers of the plurality of layers comprising features from at least two different scales, resulting in features of at least three different scales.

Clause 19: The system of any of clauses 15-18, wherein the at least one entity comprises at least one of the following: an instrument, the imaging device, a physical artifact, a manifested artifact, or any combination thereof.

Clause 20: The system of any of clauses 15-19, wherein tracking the time-varying spatial data comprises tracking at least one of the following: translational/rotational positions of the at least one entity, a velocity of the at least one entity, an acceleration of the at least one entity, an inertial measurement of the at least one entity, or any combination thereof.

Clause 21: The system of any of clauses 15-20, wherein tracking the time-varying spatial data is based on at least one of the following: an inertial measurement unit, a tracking system, a position sensor, robotic kinematics, inverse kinematics, or any combination thereof.

Clause 22: The system of any of clauses 15-21, wherein the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof.

Clause 23: The system of any of clauses 15-22, wherein the artificial neural network comprises an encoder and a decoder, and wherein at least one of the decoder and the encoder is configured to utilize the spatio-temporal data as input.

Clause 24: The system of any of clauses 15-23, wherein the artificial neural network comprises at least one of the following: Long-Short Term Memory (LSTM) units, Gated Recurrent Units (GRUs), temporal convolutional networks, or any combination thereof.

Clause 25: The system of any of clauses 15-24, wherein the spatial data comprises a position and/or orientation of the patient and/or an instrument.

Clause 26: The system of any of clauses 15-25, wherein analyzing the series of medical images comprises identifying at least one anatomic structure in the series of images, the at least one anatomic structure comprising at least one of the following: a vessel, an artery, a vein, a ligament, a nerve, a strand of muscle, a strand or meshwork of fascia, a blob of fat, a blob of grafted fat, a lymphatic structure, a patch of skin, a tendon, a bone, a piece of cartilage, a pulmonary pleural line, a cardiac valve, a cardiac chamber, a cardiac surface, a trachea, a brain region, a duct, trabecular meshwork, a corneal layer, a retinal layer, an ocular lens, an ocular surface, a soft tissue, a palisade of Vogt of a limbus, an organ, an extra-cellular structure, an intercellular structure, a cell, or any combination thereof.

Clause 27: The system of any of clauses 15-26, wherein the series of medical images comprises at least one of the following: ultrasound images, optical coherence tomography (OCT) images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multispectral images, tomographic images, projection images, integration images, reconstructed images, or any combination thereof.

Clause 28: The system of any of clauses 15-27, wherein analyzing the series of medical images comprises segmenting one or a plurality of vessels represented in the series of medical images.

Clause 29: A computer program product for analyzing medical images using a neural network, comprising at least one non-transitory computer-readable medium including instructions that, when executed by a computing device, cause the computing device to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, one or more layers of the plurality of layers each combining features from at least three different scales, wherein at least one layer of the plurality of layers of the artificial neural network is configured to learn spatio-temporal relationships based on the spatio-temporal data.

Clause 30: The method of any of clauses 1-14, wherein at least a portion of the artificial neural network comprises dilated convolutions.

Clause 31: The method of any of clauses 1-14 and 30, wherein at least a portion of the artificial neural network comprises residual connections and/or skipped connections.

Clause 32: The system of any of clauses 15-28, wherein at least a portion of the artificial neural network comprises dilated convolutions.

Clause 33: The system of any of clauses 15-28 and 32, wherein at least a portion of the artificial neural network comprises residual connections and/or skipped connections.

Clause 34: A method for analyzing spatio-temporal medical images using an artificial neural network, comprising: capturing a series of medical images of a patient with an imaging device, the series of medical images comprising visual movement of at least one entity comprising at least a portion of at least one of the patient and an object; tracking, with a computing device, time-varying spatial data associated with the at least one entity based on the visual movement; generating, with a computing device, spatio-temporal data by correlating the time-varying spatial data with the series of medical images; and analyzing, with a computing device, the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data.

Clause 35: A system for analyzing spatio-temporal medical images using an artificial neural network, comprising a computing device programmed or configured to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data.

Clause 36: A computer program product for analyzing medical images using a neural network, comprising at least one non-transitory computer-readable medium including instructions that, when executed by a computing device, cause the computing device to: capture a series of medical images of a patient with an imaging device, the series of medical images comprising visual movement of at least one entity comprising at least a portion of at least one of the patient and an object; track time-varying spatial data associated with the at least one entity based on the visual movement; generate spatio-temporal data by correlating the time-varying spatial data with the series of medical images; and analyze the series of medical images based on an artificial neural network comprising a plurality of layers, the artificial neural network comprising dilated convolutions and/or dense connections between multiple layers of different scale and resolution, combining features from at least three different scales, at least one layer of the plurality of layers configured to learn spatio-temporal relationships based on the spatio-temporal data.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include a GPU. In non-limiting embodiments, a computing device may be comprised of a plurality of circuits.

Non-limiting embodiments provide for a system, method, and computer program product for analyzing a series of medical images (such as anatomic, physiological, functional, and/or other biomedical images) using an artificial neural network (e.g., such as a convoluted neural network (CNN)) and spatio-temporal data. In some non-limiting embodiments, a CNN-based computer-vision approach is utilized to automatically identify and label anatomic structures visible in cross-sectional tomographic image sequences, such as but not limited to ultrasound or optical coherence tomography (OCT). Non-limiting embodiments allow for the simultaneous tracking of spatial information, such as motion and orientation data, with the tracking of changes to entities such as anatomic structures. This allows for parameters of the anatomic structures, such as shape, to be tracked over space and time. Such variations to shape may include, for example, vessel compression, or branch points, as examples.

Figure 1:
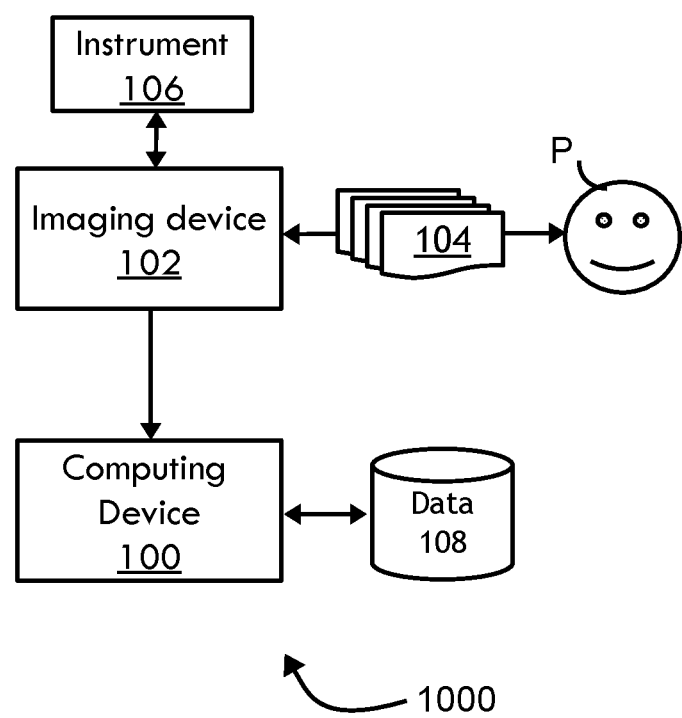
FIG. 1 illustrates a schematic diagram for a system for analyzing spatio-temporal medical images using an artificial neural network according to non-limiting embodiments.

Referring now to FIG. 1, a system 1000 for analyzing a series of medical images 104 is shown according to a non-limiting embodiment. The system 1000 includes an imaging device 102, which may include an ultrasound scanner, an OCT scanner, and/or the like, that captures a series of medical images 104 of a patient P over a time period. The medical images may include ultrasound images, OCT images, CT images, MRI images, PET images, SPECT images, fluoroscopy images, X-ray images, mammography images, tomosynthesis images, photoacoustic images, acousto-optic images, endoscopic images, microscopic images, fundus images, scanning laser ophthalmoscope (SLO) images, smartphone images, 3D (depth) images, focal-stack images, light-field images, visible-light images, infrared images, ultraviolet images, thermal images, multi-spectral images, tomographic images, projection images, integration images, reconstructed images, and/or the like. The imaging device 102 may be in communication with an instrument 106 for operating the imaging system 102, such as an ultrasound probe, although various instruments may be utilized. The imaging device 102 is also in communication with a computing device 100, which is in communication with a data storage device 108.

With continued reference to FIG. 1, the series of medical images 104 may include images of a patient's body that may change from one slice (or volume) to the next based on a visual motion of an entity, such as the patient and/or an object. For example, such motion may include internal motion (e.g., beating vessels, moving fetus, etc.), external motion (e.g., patient body motion, motion of the instrument 106 or other tool, changing the angle of the OCT scan beam, etc.), and/or interaction motion (e.g., pressing the ultrasound transducer into the patient, thereby deforming the internal anatomy). A moving object may include a physical artifact, such as one or more anatomic structures (e.g., a vessel, an artery, a vein, a ligament, a nerve, a strand of muscle, a strand or meshwork of fascia, a blob of fat, a blob of grafted fat, a lymphatic structure, a patch of skin, a tendon, a bone, a piece of cartilage, a pulmonary pleural line, a lung consolidation, a cardiac valve, a cardiac chamber, a cardiac surface, a trachea, a brain region, a duct, trabecular meshwork, a corneal layer, a retinal layer, an ocular lens, an ocular surface, a soft tissue, a palisade of Vogt of a limbus, an organ, an extra-cellular structure, an intercellular structure, a cell, and/or the like), and/or a manifested artifact, such as visual effects created by the imaging process and/or a tool used therein that do not physically exist but are indicative of one or more physiological properties. Such visual effects may include, for example, needle-related ultrasound artifacts (e.g., reverberations, side lobes, bayonet artifacts, and/or the like) and lung-related artifacts and structures (e.g., A-lines, B-lines, Z-lines, commit-tails, and/or the like). Various other artifacts may also be tracked.

Still referring to FIG. 1, the computing device 100 is configured to track time-varying spatial data of an entity based on the visual movement of that entity in one or more images of the series of images 104. Given a variety of possible changes that can occur between consecutively acquired images, non-limiting embodiments track the position of the entity as these values vary from image to image of a plurality of images in the series of image 104 (e.g., at least a subset of the series of images 104). The computing device 100, based on the tracked time-varying spatial data spanning across images in the series of images 104, may generate spatio-temporal data by correlating the time-varying spatial data with images in the series of images 104. For example, values and/or changes in values in the spatial data may be associated with one or more specific images by being linked to those images. The spatio-temporal data may represent changes in shape, position, and/or orientation over time. The linked data may be represented in memory in the data storage device 108.

In non-limiting embodiments, and still referring to FIG. 1, the generated spatio-temporal data may be stored in the data storage device 108 and analyzed. For example, the spatio-temporal data may be input into an artificial neural network executed by the computing device 100, such as but not limited to a Convolutional Neural Network (CNN). For example, a CNN enhanced with the spatio-temporal data may be used to analyze structure tissue changes over time in ultrasound video sequences of vessels (e.g., in the hand) such as to measure intima-media thickness. As another example, the enhanced CNN may be used to analyze structural changes of the anterior segment of the eye, such as reconstructing individual volumes for each day and then quantifying changes in the palisades-of-Vogt stem-cell niche in the limbus over multiple days. It will be appreciated that various other uses and applications are possible.

In non-limiting embodiments, the artificial neural network may be configured in a U-Net architecture including dense and/or residual connections between successive downsampling and upsampling layers, such layers therefore processing inputs generated at a variety of scales. In such embodiments or in other non-limiting U-Net embodiments (e.g., which may not include dense or residual connections), the U-Net may include blocks or layers with dilated (as well as regular) convolutions that compute features across a variety of scales. In contrast to prior U-Net architectures, such individual layers or blocks may be configured to compute features across at least three (3) scales by a combination of convolutions of one or more scales and connections to other layers comprising one or more scales. One or more layers of the downsampling and/or upsampling layers may be configured to learn spatio-temporal relationships. The spatio-temporal data may be incorporated into the artificial neural network in various ways. For example, in some non-limiting embodiments, Long-Short Term Memory (LSTM) is incorporated into the decoder portion of a CNN architecture. Through the use of LSTM-based multi-scale networks, multi-scale features are intelligently combined to retain relevant features over video time steps, and only update the features when required. In some non-limiting embodiments, artificial neural network architectures may be modified to further incorporate, in the encoder and/or decoder portion of a network, LSTMs and/or other forms of memory, such as Gated Recurrent Units (GRUs) or other architectural elements such as "Temporal" Convolutional Networks.

In other non-limiting embodiments, other network architectures, such as a residual neural network (ResNet) or Coarse-to-Fine Context Memory (CFCM) network, may be enhanced to compute multi-scale features and spatio-temporal features and/or relationships. In other non-limiting embodiments, multi-scale networks such as a High Resolution Network (HRNet) may be configured to learn spatio-temporal features and/or relationships.

In non-limiting embodiments, incorporating the spatio-temporal data into an artificial neural network results in an enhanced neural network that can be used for numerous purposes. For example, the enhanced neural network maybe used to analyze structure tissue changes over time in ultrasound video sequences of vessels (e.g., in the hand) such as to measure intima-media thickness. In another example, the enhanced neural network may be used to analyze structural changes of the anterior segment of the eye, such as reconstructing individual volumes for each day and then quantifying changes in the palisades-of-Vogt stem-cell niche in the limbus over multiple days. It will be appreciated that various other uses and applications are possible.

In non-limiting embodiments, the series of medical images 104 are acquired in a spatio-temporal sequence, such that as the instrument 106 (e.g., ultrasound transducer or the like) is moved across the body of the patient P, the view of the internal anatomy moves and changes in the ultrasound video. The user (e.g., technician, doctor, or other operator or analyst) does not need to know how the instrument 106 was actually moved, as the LSTM of the network infers how the instrument 106, patient P, or any tools used in the process were moving. In some examples, additional information (e.g., motion information) about how the instrument 106, patient P, and/or tools that are moving may be available, such as through tracking translational/rotational positions, velocities, accelerations, and/or other output from inertial measurement units, tracking systems (e.g., spatial tracking systems for any number of dimensions), position sensors, robotic kinematics, and/or inverse kinematics, as examples. For example, one or more sensors arranged on the instrument 106, patient P, and/or tools may provide motion information to be incorporated into the LSTM such that the computing device 100 can better determine how entities (such as the moving instrument 106, patient P, and/or tools) were moving relative to other entities.

Figure 2:
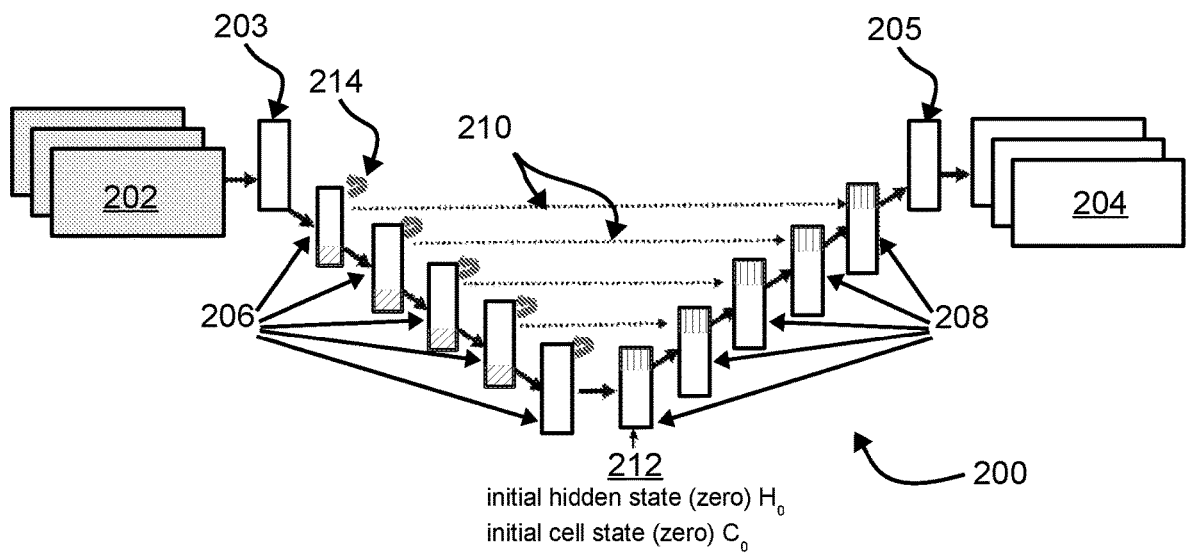
FIG. 2 illustrates an artificial neural network model for use in a system for analyzing spatio-temporal medical images using an artificial neural network according to non-limiting embodiments.

Referring now to FIG. 2, an artificial neural network 200 is shown according to a non-limiting embodiment. The network 200 includes a downsampling encoder (e.g., the portion of the network 200 including encoding blocks 206) and an LSTM-based decoder (e.g., the portion of the network 200 including decoding blocks 208). The encoding blocks 206 compute features from the image in a sequence of scales, with feature maps going down in resolution with individual kernels thereof computing features from a larger proportion of their input features maps (and thus having a larger receptive field in the original input images), from block 203 down the encoder portion of the network 200. Likewise, the decoding blocks 208 compute features in a sequence of scales, with feature maps going up in resolution with individual kernels thereof computing features from a smaller proportion of their input feature maps, from block 212 to block 205 up the decoder portion of the network 200. Repetitions 214 for each block may be included in the network 200 (e.g., repetitions of 2, 3, 4, 6, 3 down the series of blocks, for example). For example, the decoder may be or incorporate a convolutional LSTM network (ConvLSTM). The network 200 model differs from U-Net segmentation models, which treat each frame (e.g., image) in a series independently. The LSTM-based model and architecture shown in FIG. 2 implements a memory mechanism (e.g., using LSTM cells in the decoding blocks 208) that considers the inter-relation between images (e.g., video frames) to retain the appearance of an entity (e.g., such as a vessel) over multiple scales for dense pixel-wise predictions. By combining the LSTM cells from the decoder portion (e.g., decoding blocks 208) of the network 200 with the spatial context gathered in the encoder portion (e.g., encoding blocks 206) of the network 200, via communicating such information to LSTM cells with communication paths 210, spatio-temporal entity-related features are estimated for improved segmentation.

Referring to FIGS. 2-5, the symbols and characters represent the following: C (convolution function); D (dilated convolution function); BN (batch normalization function); ReLU (rectified linear activation unit); T (output classes: binary (2), multi (2, ... )); N (number of feature maps, e.g., {32, 64, 128, 56, 512}); $H_t$ (hidden state at time i); $C_t$ (cell state at time t); ● (element-wise multiplication function); σ (sigmoid activation); x (convolution); and + (element-wise sum function).

Figure 3:
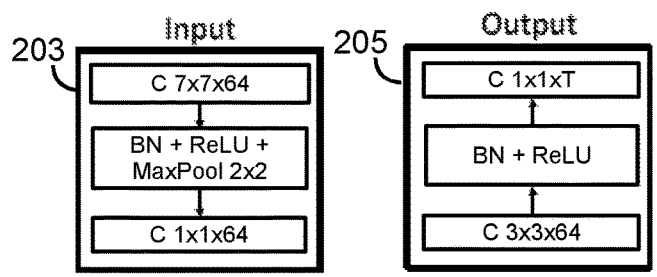
FIG. 3 illustrates an input structure and output structure for use in a system for analyzing spatio-temporal medical images using an artificial neural network according to non-limiting embodiments.

Referring now to FIGS. 2 and 3, the artificial neural network 200 receives a series of images as input 202 and begins encoding the images with block 203. The network 200 decodes from block 212 and results block 205, and outputs a series of images having one or more segmented entities as output 204. A ReLU follows the BN and holds a rectifier (e.g., an activation function).

Figure 4:
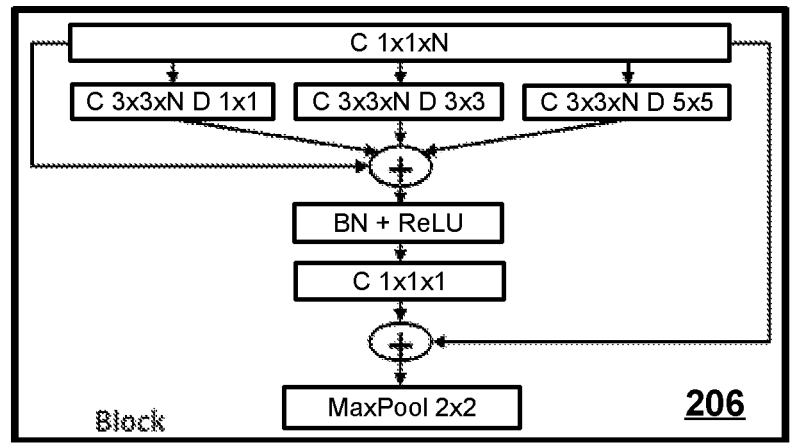
FIG. 4 illustrates an encoding block structure for use in a system for analyzing spatio-temporal medical images using an artificial neural network according to non-limiting embodiments.

Referring now to FIGS. 2 and 4, the encoder portion of the network 200 includes encoding blocks 206 that extract meaningful representations of the entity appearance over multiple scales using dilated convolutions and residual connections. The feature maps characterized at the first several layers of the encoder portion of the network 200 depict finely defined properties (edges, corners, curves, and/or the like), which are considered low-level attributes that are limited due to their smaller receptive field. At the deeper layers of the network, coarse but complex attributes are seen with poorly defined properties (e.g., a contour of an entity). At this level, more of the image is seen on a global scale due to the larger receptive field of the individual kernels that compute the feature maps. Residual connections and dilated convolutions gather additional spatial information, especially relating to faintly discernible boundaries, and inculcate (e.g., pass) this information from one block to the next to prevent gaps in the final segmentation. Dilated convolutions gather contextual information about broader surrounding image content to accurately segment boundaries of an entity (e.g., object or tissue boundaries). As an example, dilated convolutions may "fill in" gaps to perform better than prior methods in regions where the contrast of boundaries is poor. Such a hierarchical representation may not independently model the dynamics of entity movement (e.g., vessel movement) in a series of images, but may be used to improve entity segmentation. For example, by communicating the feature maps extracted at different scales from the encoder portion to the LSTM cells in the decoder portion, the LSTM cells retain relevant features of interest in memory and can therefore be integrated into the network model to produce segmentations of better quality and precision.

Figure 5:
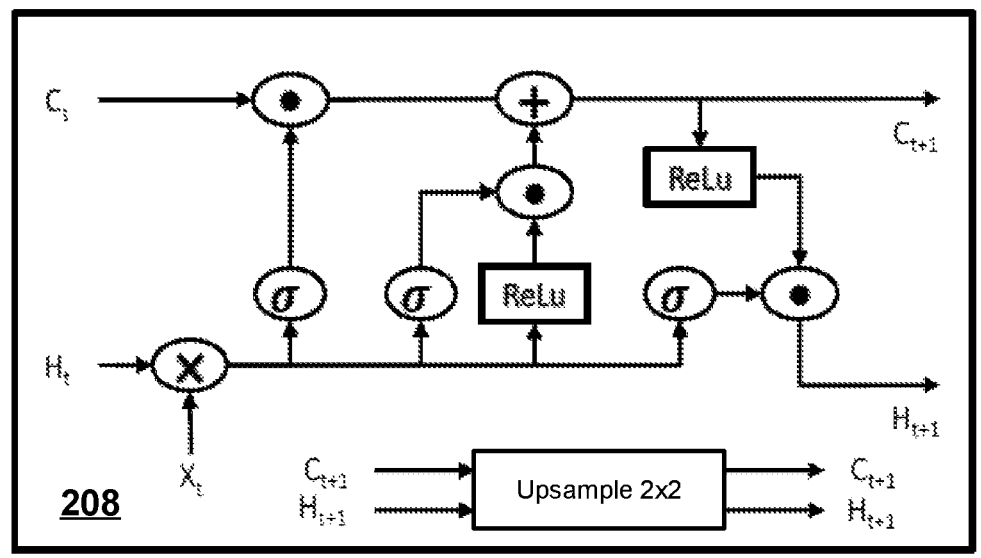
FIG. 5 illustrates a decoding block structure for use in a system for analyzing spatio-temporal medical images using an artificial neural network according to non-limiting embodiments.

Referring now to FIGS. 2 and 5, the decoder portion of the network 200 includes decoding blocks 208. Every encoding block 206 communicates its output feature maps to an LSTM memory unit in the decoder portion of the network 200 (e.g., via communication paths 210 to a corresponding decoding block 608). For example, LSTM cells in each decoding block 208 may be incorporated into the network 200 and configured to consider the output of each encoding block 206 as a single time step and implement a memory mechanism to integrate the feature maps extracted at multiple scales in a coarse-to-fine manner. In non-limiting embodiments, such integration may be performed with gated logic structures in the decoding blocks 208 that regulate the removal or addition of new information to the cell state. In this manner, global contextual information from the deepest encoder layer (e.g., the lowermost encoding block 206 and all repetitions thereof) is observed by the LSTM unit first, and as the receptive fields are reduced, finer details about the entity are added (e.g., further information about vessel contour).

With continued reference to FIGS. 2 and 5, each decoding block 208 incorporates an LSTM unit that utilizes, as input, three feature sets (input state, hidden state, and cell state) and outputs information using three logic gates (forget gate, input gate, and output gate). The forget gate is configured to remove information from the cell state feature set. The input gate is configured to determine the new information that will be incorporated in the cell state feature set. The output gate is configured to regulate the output of the respective LSTM unit. The LSTM unit in each decoding block 208 utilizes convolutions and a ReLU to improve segmentation accuracy, although a variety of structures for the LSTM units are possible. The initial hidden state and initial cell state of an initial decoding block (e.g., block 212) at a deepest level of the network 200 may be initialized to zero, such that the hidden state and cell state of each other LSTM units (e.g., part of decoding blocks 208 excluding 212) are upsampled from the LSTM unit below it. The use of structured LSTM-based decoding blocks 208, such as ConvLSTM blocks, facilitates the network 200 to retain shape attributes of an entity and segment the entity in each of the image(s).

Figure 6:
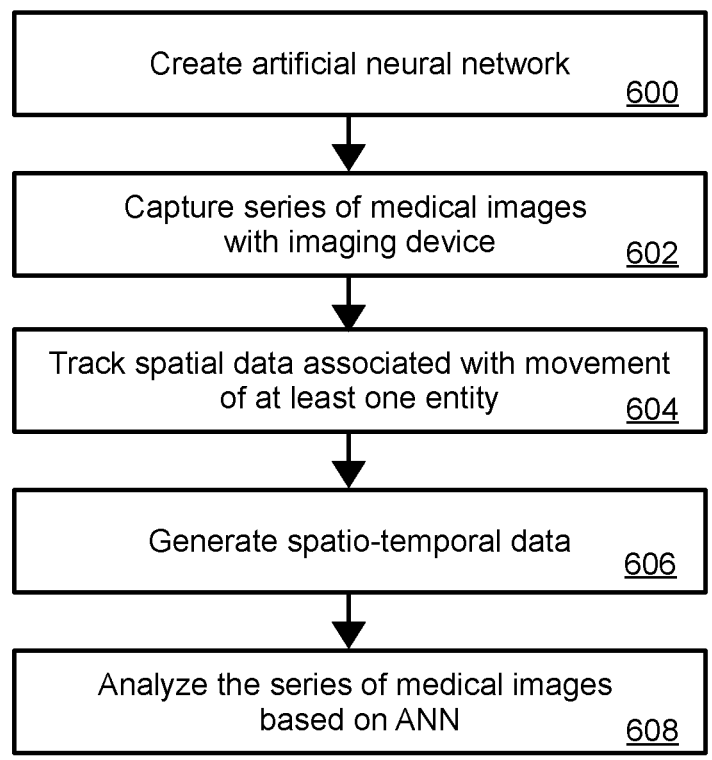
FIG. 6 illustrates a flow diagram for analyzing spatio-temporal medical images using an artificial neural network according to non-limiting embodiments.

Referring now to FIG. 6, shown is a flow diagram for a method for analyzing a series of medical images according to a non-limiting embodiment. It will be appreciated that the order of the steps shown in FIG. 6 is for illustration purposes only and that non-limiting embodiments may involve more steps, fewer steps, different steps, and/or a different order of steps. At step 600, an artificial neural network is created. In non-limiting embodiments, the artificial neural network is created with dense and/or residual connections between layers. In such embodiments and in other non-limiting embodiments, the artificial network may include a plurality of layers, where one or more layers of the plurality each combine features from at least three different scales/resolutions. In some examples, a layer that combines features from at least three different scales may include, in part, dilated convolutions of different scales, dense connections between at least a subset of layers including features from three different scales, and/or residual connections between at least a subset of layers including features from three different scales.

The network may be trained in various ways such as, for example, through supervised and/or unsupervised methodologies. In non-limiting examples, still images may be used to train the non-temporal parts of the network. Once the non-temporal parts of the network are trained, video may be used to train the full network with spatio-temporal data. At step 602, a series of medical images are captured with an imaging device, such as an ultrasound scanner, an OCT scanner, and/or the like. The series of medical images may include frames from video, for example, showing motion of an entity, such as the patient, an object, and/or a portion thereof. In some examples, one or more entities may move in a plurality of the frames (e.g., images) captured and, in some examples, one or more entities outside of the frames (e.g., such as an ultrasound transducer capturing the images) may move relative to the entities within the frame.

Still referring to FIG. 6, at step 604 spatial data is tracked with respect to the movement of the at least one entity in the frames or outside of the frames. Spatial data may be tracked as absolute or relative spatial coordinates, for example, in two-dimensional or three-dimensional space. Spatial data may include translational/rotational positions, velocities, accelerations, and/or other output from inertial measurement units, tracking systems (e.g., spatial tracking systems for any number of dimensions), position sensors, robotic kinematics, and/or inverse kinematics, as examples. At step 606, spatio-temporal data is generated by correlating the spatial data tracked at step 604 with the series of medical images captured at step 602. The spatio-temporal data may include associations (e.g., links) in one or more databases. At step 608, the series of medical images is analyzed using the artificial neural network created at step 600. The artificial neural network may be trained to identify spatio-temporal relationships of entity movement based on incorporating LSTM cells as explained herein. The result of step 608 may be a series of medical images in which one or more entities are segmented, such that the motion of the one or more entities through the series of images (e.g., in a video for example) may be observed and recorded.

The system was tested using video sequences from two scanners: a Visualsonics Vevo 2100 UHFUS machine (Fujifilm, Canada), and a Diasus HFUS scanner (Dynamic Imaging, UK). The UHFUS scanner provided a 50 MHz transducer with physical resolution of 30 μm and a pixel spacing of 11.6 μm. 58 UHFUS sequences were used, each containing 100 2D B-scans with dimensions of 832 by 512 pixels. The HFUS scanner had a 10-22 MHz transducer with a pixel spacing of 92.5 μm. 26 HFUS sequences were used, each containing a variable number of 2D B-scans (50-250) with dimensions of 280 by 534 pixels. All of the sequences contained arteries of the hand (e.g., superficial palmar arch) with a wide range of adjustable gain settings (40-70 dB). Extensive probe motions were also acquired, such as longitudinal scanning, beating vessels, out-of-plane vessel deformation, and/or the like. An expert grader annotated all the 84 UHFUS and HFUS sequences. To show general applicability, the system was also tested on an x-ray dataset containing 138 annotated images with 58 abnormal and 80 normal cases.

Of the 58 UHFUS sequences used for testing, 20 were chosen for training and the remaining 38 were used for testing. Similarly, from the 26 HFUS sequences, 20 were chosen for training and the remaining 6 were used for testing. A three-fold cross-validation for the vessel segmentation task was performed. To simulate a clinical application, an ensemble of the two best models with the lowest validation loss (from a single fold) were used for testing. A three-fold cross validation for the lung segmentation task was also performed in the x-ray dataset. For the vessel segmentation task, the errors were compared against those from a level set-based method and two LSTM-based segmentation approaches. For the lung segmentation task, the results were compared against a state-of-the-art model. The sequences contained variable image sizes and training a ConvLSTM with full-sized images was limited by GPU RAM. The artificial neural network was therefore trained by scaling each B-scan to 256×256 pixels. Data augmentation (elastic deformation, blurring, and/or the like) was performed to increase the training set to 120,000 images. To compare against other methods, each baseline result was compared against the expert annotation. The following metrics were calculated to quantify errors: 1) Dice Similarity Coefficient (DSC) [6], 2) Hausdorff Distance (HD) in millimeters [6], 3) Mean Absolute Deviation (MAD) in millimeters, 4) Definite False Positive and Negative Distances, 5) Precision (Prec.), and 6) Recall (Rec.).

Table 1 shows segmentation error comparison for UHFUS (top USVS-Net values) and HFUS (bottom USVS-Net values) image sequences compared to other methods:

| Method | DSC | HD (mm) | MAD (mm) | DFPD | DFND | Prec | Rec |
|---|---|---|---|---|---|---|---|
| Traditional* [6] | 81.13 ± 3.72 | 0.21 ± 0.05 | 0.06 ± 0.02 | 3.08 ± 1.68 | 8.71 ± 0.55 | 96.44 ± 2.56 | 72.03 ± 4.9 |
| DecLSTM [10] | 88.83 ± 3.74 | 0.15 ± 0.06 | 0.04 ± 0.03 | 6.76 ± 1.05 | 5.35 ± 1.4 | 87.54 ± 4.45 | 92.46 ± 3.93 |
| CFCM34 [11] | 88.45 ± 3.97 | 0.15 ± 0.07 | 0.04 ± 0.04 | 6.41 ± 1.21 | 5.51 ± 1.39 | 88.07 ± 4.83 | 91.31 ± 3.87 |
| USVS-Net | 92.15 ± 2.29 | 0.11 ± 0.03 | 0.03 ± 0.01 | 6.83 ± 1.13 | 6.33 ± 1.36 | 91.76 ± 3.78 | 93.2 ± 3.34 |
| Traditional [6] | 83.6 ± 5.47 | 0.47 ± 0.13 | 0.08 ± 0.04 | 2.08 ± 2.01 | 6.02 ± 0.51 | 95.13 ± 4.8 | 75.42 ± 7.49 |
| DecLSTM [10] | 88.34 ± 5.21 | 0.39 ± 0.1 | 0.05 ± 0.3 | 4.23 ± 0.97 | 5.61 ± 0.78 | 87.21 ± 3.15 | 83.94 ± 7.61 |
| CFCM34 [11] | 89.44 ± 3.34 | 0.36 ± 0.09 | 0.05 ± 0.02 | 3.74 ± 1.04 | 5.23 ± 0.62 | 94.21 ± 3.48 | 85.74 ± 5.51 |
| USVS-Net | 89.74 ± 3.05 | 0.36 ± 0.08 | 0.04 ± 0.02 | 4.98 ± 0.86 | 4.53 ± 1.03 | 88.63 ± 0.05 | 91.52 ± 0.05 |

Based on these tests, the existing level set approach only succeeded in segmenting vessels in 33 of 38 sequences, while the LSTM-based methods successfully segmented vessels in all sequences. The system and network architecture described herein produced output that matched the expert annotations with the highest accuracy and the lowest errors. The system processed and output sub-mm vessel localization in UHFUS sequences presenting with increased speckle and large vessel motion.

Figure 7:
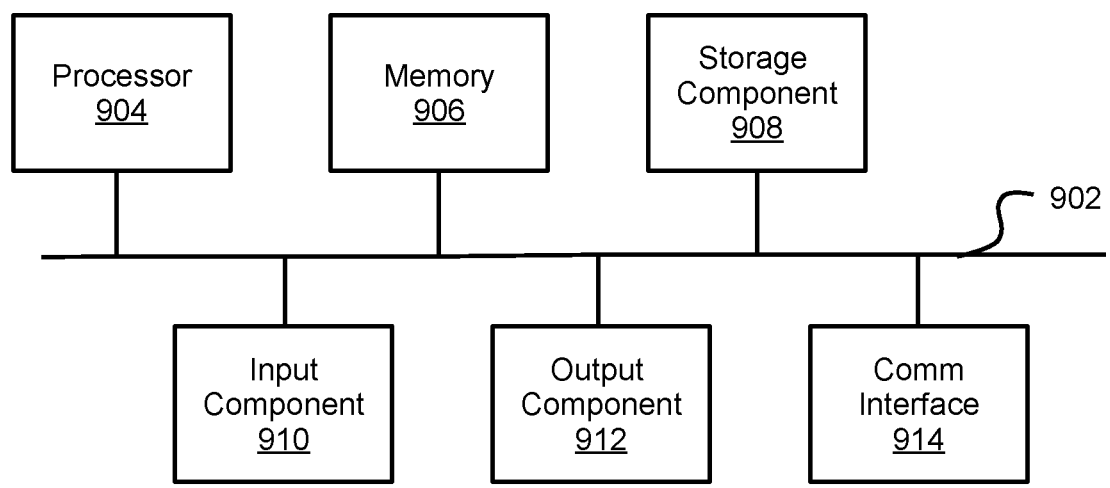
FIG. 7 illustrates example components of a computing device used in connection with non-limiting embodiments.

Referring now to FIG. 7, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 7. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for analyzing spatio-temporal medical images using an artificial neural network, comprising:
    capturing a series of medical images of a patient with an imaging device, the series of medical images comprising visual movement of at least one entity comprising at least a portion of at least one of the patient and an object;
    tracking, with a computing device, time-varying spatial data associated with the at least one entity based on the visual movement of the at least one entity in one or more images of the series of medical images;
    generating, with a computing device, spatio-temporal data by correlating the time-varying spatial data with the series of medical images;
    inputting the spatio-temporal data into an artificial neural network; and
    analyzing, with a computing device, the series of medical images based on the spatio-temporal data by using the artificial neural network comprising a plurality of layers, one or more layers of the plurality of layers each combining features from at least three different scales, wherein a layer of the plurality of layers of the artificial neural network is configured to learn multi-scale spatio-temporal relationships of features from at least two different scales of the at least three different scales, the features from the layer and a preceding layer, based on the spatio-temporal data, and wherein the one or more layers that combine features from the at least three different scales comprise at least one of the following: dilated convolutions of different scales, dense and/or residual connections between at least a subset of layers of the plurality of layers wherein the at least the subset of layers comprises features from at least three different scales, or any combination thereof.

2. The method of claim 1, wherein the one or more layers that combine features from the at least three different scales comprise dilated convolutions of different scales.

3. The method of claim 1, wherein the one or more layers that combine features from the at least three different scales comprise dense and/or residual connections between at least a subset of layers of the plurality of layers, the at least the subset of layers comprising features from at least three different scales.

4. The method of claim 1, wherein the one or more layers that combine features from the at least three different scales comprise convolutions of at least two different scales and connections to a subset of layers of the plurality of layers comprising features from at least two different scales, resulting in features of at least three different scales.

5. The method of claim 1, wherein the at least one entity comprises at least one of the following: an instrument, the imaging device, a physical artifact, a manifested artifact, or any combination thereof.

6. The method of claim 1, wherein tracking the time-varying spatial data comprises tracking at least one of the following: translational/rotational positions of the at least one entity, a velocity of the at least one entity, an acceleration of the at least one entity, an inertial measurement of the at least one entity, or any combination thereof.

7. The method of claim 1, wherein tracking the time-varying spatial data is based on at least one of the following: an inertial measurement unit, a tracking system, a position sensor, robotic kinematics, inverse kinematics, or any combination thereof.

8. The method of claim 1, wherein the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof.

9. The method of claim 1, wherein the artificial neural network comprises an encoder and a decoder, and wherein at least one of the decoder and the encoder is configured to utilize the spatio-temporal data as input.

10. The method of claim 1, wherein the artificial neural network comprises at least one of the following: Long-Short Term Memory (LSTM) units, Gated Recurrent Units (GRUs), temporal convolutional networks, or any combination thereof.

11. A system for analyzing spatio-temporal medical images using an artificial neural network, comprising a computing device programmed or configured to:
  capture a series of medical images of a patient with an imaging device, the series of medical images comprising visual movement of at least one entity comprising at least a portion of at least one of the patient and an object;
  track time-varying spatial data associated with the at least one entity based on the visual movement of the at least one entity in one or more images of the series of medical images;
  generate spatio-temporal data by correlating the time-varying spatial data with the series of medical images;
  input the spatio-temporal data into an artificial neural network; and
  analyze the series of medical images based on the spatio-temporal data by using the artificial neural network comprising a plurality of layers, one or more layers of the plurality of layers each combining features from at least three different scales, wherein a layer of the plurality of layers of the artificial neural network is configured to learn multi-scale spatio-temporal relationships of features from at least two different scales of the at least three different scales, the features from the layer and a preceding layer based on the spatio-temporal data, and wherein the one or more layers that combine features from the at least three different scales comprise at least one of the following: dilated convolutions of different scales, dense and/or residual connections between at least a subset of layers of the plurality of layers wherein the at least the subset of layers comprises features from at least three different scales, or any combination thereof.

12. The system of claim 11, wherein the one or more layers that combine features from the at least three different scales comprise dilated convolutions of different scales.

13. The system of claim 11, wherein the one or more layers that combine features from the at least three different scales comprise dense and/or residual connections between at least a subset of layers of the plurality of layers, the at least the subset of layers comprising features from at least three different scales.

14. The system of claim 11, wherein the one or more layers that combine features from the at least three different scales comprise convolutions of at least two different scales and connections to a subset of layers of the plurality of layers comprising features from at least two different scales, resulting in features of at least three different scales.

15. The system of claim 11, wherein the at least one entity comprises at least one of the following: an instrument, the imaging device, a physical artifact, a manifested artifact, or any combination thereof.

16. The system of claim 11, wherein tracking the time-varying spatial data comprises tracking at least one of the following: translational/rotational positions of the at least one entity, a velocity of the at least one entity, an acceleration of the at least one entity, an inertial measurement of the at least one entity, or any combination thereof.

17. The system of claim 11, wherein tracking the time-varying spatial data is based on at least one of the following: an inertial measurement unit, a tracking system, a position sensor, robotic kinematics, inverse kinematics, or any combination thereof.

18. The system of claim 11, wherein the spatio-temporal data comprises at least one of the following: data representing an internal motion within the patient's body, data representing an external motion of the patient's body, data representing a motion of an instrument, data representing an angle of the instrument, data representing a deforming motion of the patient's body, or any combination thereof.

19. The system of claim 11, wherein the artificial neural network comprises an encoder and a decoder, and wherein at least one of the decoder and the encoder is configured to utilize the spatio-temporal data as input.

20. The system of claim 11, wherein the artificial neural network comprises at least one of the following: Long-Short Term Memory (LSTM) units, Gated Recurrent Units (GRUs), temporal convolutional networks, or any combination thereof.

21. A computer program product for analyzing medical images using a neural network, comprising at least one non-transitory computer-readable medium including instructions that, when executed by a computing device, cause the computing device to:
  capture a series of medical images of a patient with an imaging device, the series of medical images comprising visual movement of at least one entity comprising at least a portion of at least one of the patient and an object;
  track time-varying spatial data associated with the at least one entity based on the visual movement of the at least one entity in one or more images of the series of medical images;
  generate spatio-temporal data by correlating the time-varying spatial data with the series of medical images;
  input the spatio-temporal data into an artificial neural network; and
  analyze the series of medical images based on the spatio-temporal data by using the artificial neural network comprising a plurality of layers, one or more layers of the plurality of layers each combining features from at least three different scales, wherein a layer of the plurality of layers of the artificial neural network is configured to learn multi-scale spatio-temporal relationships of features from at least two different scales of the at least three different scales, the features from the layer and a preceding layer, based on the spatio-temporal data, and wherein the one or more layers that combine features from the at least three different scales comprise at least one of the following: dilated convolutions of different scales, dense and/or residual connections between at least a subset of layers of the plurality of layers wherein the at least the subset of layers comprises features from at least three different scales, or any combination thereof.

* * * * *